United States Patent [19]

Hendershot, Jr.

[11] Patent Number: 5,652,493

[45] Date of Patent: Jul. 29, 1997

[54] POLYPHASE SPLIT-PHASE SWITCHED RELUCTANCE MOTOR

[75] Inventor: James R. Hendershot, Jr., Hillsboro, Ohio

[73] Assignee: Tridelta Industries, Inc. (Magna Physics Division), Hillsboro, Ohio

[21] Appl. No.: 351,825

[22] Filed: Dec. 8, 1994

[51] Int. Cl.$^6$ .................. H02P 1/46; H02K 11/00
[52] U.S. Cl. .................. 318/701; 318/254; 318/138; 318/696
[58] Field of Search ............... 318/138, 245, 318/254, 700–780, 696, 685; 310/191, 112, 12, 13, 11, 49 R, 261

[56]  References Cited

U.S. PATENT DOCUMENTS

| | | | |
|---|---|---|---|
| 3,930,190 | 12/1975 | Liska | 318/254 |
| 4,255,696 | 3/1981 | Field, II | 318/696 |
| 4,371,801 | 2/1983 | Richter | 310/156 |
| 4,401,939 | 8/1983 | Korbell | 322/59 |
| 4,477,759 | 10/1984 | Guerin et al. | 318/696 |
| 4,508,998 | 4/1985 | Hahn | 318/138 |
| 4,525,657 | 6/1985 | Nakase et al. | 318/254 |
| 4,604,541 | 8/1986 | Murasato et al. | 310/180 |
| 4,794,286 | 12/1988 | Taenzer | 310/12 |
| 4,835,408 | 5/1989 | Ray et al. | 307/24 |
| 4,871,934 | 10/1989 | Okamoto et al. | 310/166 |
| 4,896,065 | 1/1990 | Tsuyama | 310/154 |
| 5,043,618 | 8/1991 | Stephenson | 310/168 |
| 5,059,884 | 10/1991 | Shah et al. | 318/701 |
| 5,093,596 | 3/1992 | Hammer | 310/191 |
| 5,111,095 | 5/1992 | Hendershot | 310/168 |
| 5,138,244 | 8/1992 | Bahn | 318/701 |
| 5,168,190 | 12/1992 | Bahn | 310/166 |
| 5,190,247 | 3/1993 | Le Chatelier | 244/103 |
| 5,194,773 | 3/1993 | Clarke | 310/112 |
| 5,200,659 | 4/1993 | Clarke | 310/112 |
| 5,205,721 | 4/1993 | Isaacson | 417/356 |
| 5,214,365 | 5/1993 | Bahn | 318/701 |
| 5,216,339 | 6/1993 | Skybyk | 318/254 |
| 5,239,217 | 8/1993 | Horst | 310/51 |
| 5,272,401 | 12/1993 | Lin | 318/696 |
| 5,274,287 | 12/1993 | Bahn | 310/68 |
| 5,274,291 | 12/1993 | Clarke | 310/112 |
| 5,304,882 | 4/1994 | Lipo et al. | 310/156 |
| 5,341,076 | 8/1994 | Bahn | 318/254 |

FOREIGN PATENT DOCUMENTS

| | | |
|---|---|---|
| 0340029 | 11/1989 | European Pat. Off. . |
| 0441970 | 8/1991 | European Pat. Off. . |

OTHER PUBLICATIONS

"Causes And Sources of Audible Noise in Electric Motors", article by James R. Hendershot, Jr. (Jun. 1993).
"An Axial Air–Gap Reluctance Motor For Variable Speed Applications", by Unnewehr et al., IEEE Transactions, vol. PAS–93, 1974, pp. 281–290.
"The Step Motor—What It Is And Does", article by K. Kordik, pp. A–1 thru A–49, published May 1974.
"Switched Reluctance Motors And Their Control", by T.J.E. Miller, 1993, pp. 90–91.

Primary Examiner—Paul Ip
Attorney, Agent, or Firm—Leydig, Voit & Mayer, Ltd.

[57]  ABSTRACT

A switched reluctance d.c. motor having a plurality stators has been disclosed. Each stator comprises phase windings for energizing a set of stator poles. The stator poles are distributed about the circumference of the stator yoke. Two phases activated in succession are associated with distinct ones of the plurality of stators. The motor of the present invention operates under a wide range of rotational speeds while reducing the switching losses and audible noise in the rotor and stator iron.

27 Claims, 11 Drawing Sheets

| COMMUTATION ROTATION SEQUENCE | |
|---|---|
| CW | CCW |
| A | A |
| B | D |
| C | C |
| D | B |

PRIOR ART 8/6 MOTOR

FIG. 13

| CHARACTERISTIC | STANDARD 8/6 SR MOTOR | NEW 8/8/4 SR MOTOR |
|---|---|---|
| STATOR POLES | 8 | 8 & 8 |
| ROTOR POLES | 6 | 4 & 4 |
| NUMBER STATORS | 1 | 2 |
| TORQUE POLES/STROKE | 2 | 4 |
| AUDIBLE NOISE | $d_b$ | $<d_b$ |
| PHASES/STATOR | 4 | 2 |
| ENERGY STROKE ANGLE | 30° | 45° |
| COMMUTATION ANGLE | 15° | 22½° |
| COMMUTATION CYCLES/REV | 24 | 16 |
| CYCLES/REV/STATOR | 24 | 8 |
| CYCLES/REV/ROTOR | 24 | 8 |

FIG. 14

POLYPHASE SPLIT-PHASE SWITCHED RELUCTANCE MOTOR

FIELD OF THE INVENTION

This invention generally relates to brushless direct current (d.c.) motors, and more particularly, to switched reluctance or variable reluctance motors that have their phase windings commutated electronically without the use of mechanical brushes or commutators. Even more specifically, the present invention related to types of brushless d.c. motors producing continuous rotational torque without the use of permanent magnets. The timing for the phase commutations can be facilitated by sensing the position of the rotor. The position sensor may be an encoder a resolver, or Hall switch sensor mounted to the shaft of the motor.

BACKGROUND OF THE INVENTION

Because of recent developments in power semiconductor devices such as power MOSFETS and IGBTS, the proliferation and usage of brushless d.c. motors has intensified in recent years. These developments have enhanced the spectrum of practical uses for such motors. The applications of such motors are centered around either variable/adjustable speed or servo positioning systems. Furthermore, switched reluctance motors, for a number of reasons are particularly well suited for applications which require operation over a wide speed variation such as traction motors for electric vehicles such as automobiles, buses and trains without the use of transmissions.

The availability of high energy permanent magnets such as samarium cobalt or neodymium boron iron has also contributed to the current interest in brushless d.c. motors. Due to the high cost of these high energy magnets and mechanical difficulties of retaining them in mountings, however, there has also been a keen interest in the class of brushless d.c. motors that do not use permanent magnets or windings in connection with the rotating member—or rotor. This class of brushless d.c. motors is commonly called switched reluctance motors or simply SR motors. The design, operation, construction and use of this class of electric motors is documented in *Switched Reluctance Motors And Their Control*, by T. J. E. Miller, Magna Physics Publishing, 1993 ISBN1-881855-02-3.

SR motors have been used extensively as stepping motors known as variable reluctance motors. When used as stepping motors, the operation of the motor is controlled by a series of clock pulses in an open loop manner. As such, the commutation frequency and phase of the motor is driven without regard to the angular position of the rotor.

In stepping motor systems, the motor has typically been referred to as a variable reluctance (VR) motor. Many of these so-called VR stepping motors are either three-phase or four-phase machines with laminated designs having many teeth on each rotor and stator magnetic pole. The many teeth facilitate the progression of the rotor at small step angles (e.g., U.S. Pat. No. 3,866,104 to Heine). It is known to separate the plurality of phases associated with a VR stepper motor so that each stator of a plurality of stators for the motor has associated with it a single phase.

Furthermore, SR motors have been developed wherein the rotor is axially displaced from the stators. A pie-shaped rotor comprises alternating magnetically permeable/nonpermeable slices separated from stator poles by axial gaps. Axial gap motors have lower power density and lower torque to inertia ratios than radial air gap motors, and are therefore not suitable for the high torque applications.

The present invention concerns a closed-loop continuously-rotating type radial gap SR motor rather than a stepping type motor which is controlled in an open-loop manner. The type of SR motor to which the present invention is directed is designed to convert electrical energy into a continuous mechanical rotation instead of bursts of torque which are difficult to control as is provided by stepping motors. The SR motor produces continuous torque (i.e., minimal torque ripple) at a desired, preset or controllable speed of motor rotation.

SR motors of the type described herein usually have stators wound with either three or four phases. Each phase is associated with a separately controlled electromagnetic winding. Each phase is energized or connected to a d.c. power source and commutated or switched at the optimum rotor position in order to produce a desired output torque characteristic having minimized torque variation as the motor rotates under the influence of the energized phases. Torque variation or torque ripple is minimized for a particular motor design at a given rotational speed by careful commutation of the phases so as to result in a constant torque vector.

In known motor control schemes, the commutation controllers energize the phases in a manner such that the duty cycles of adjacent phases overlap. The summed torque provided by the overlapping energized phases maintains the torque at a level near the peak torque for a conventional SR motor commutated with unipolar d.c. voltage.

SR motors having magnetically permeable rotors are very robust motors, have a very simple rotor construction and an extremely compactly wound stator. Such structural characteristics yield the lowest potential manufacturing cost of any known motor. Furthermore, due to their simple construction SR motors are well suited for heavy duty use in the most severe environments and can operate in temperature extremes, for example, between −100° and +500° C.

In SR motors there is no need for bi-directional current to energize each phase in order to produce torque since the stator poles magnetically attract soft iron rotor poles rather than north or south magnetized permanent magnets. Therefore, the direction of the current energizing the stator poles remains unchanged and the rotor poles change in accordance with the polarity of the energized stator poles.

Because polarity of the current is not important in SR motors, the stator phase windings are connected in series with switching transistors thereby eliminating the possibility of shoot-through faults. This possibility cannot be eliminated in induction motors and permanent magnet brushless motors where the phase windings are connected in a "Y" or Delta configuration.

While increasing the number of phases may reduce torque ripple, one disadvantage of increasing the number of phases and the number of poles in a motor is the increase in switching or commutation frequency. When a phase of a motor is energized or de-energized the change in magnetic flux resulting from the change in current flowing through the phase winding causes eddy current losses in the lamination iron of the stator and rotor, which in turn causes heating. As the rotation speed of the rotor increases, the commutation frequency increases for the phase windings. The increased commutation frequency increases losses which in turn causes heating in the iron core of the stator and rotor.

Another loss resulting from magnetic field flux reversals is known as hysteresis loss. These flux reversals also cause a heating loss in the iron cores of the stator and rotor and the heating effect increases with the number of phases, the number of poles and the rotational speed of the motor. A full magnetic flux reversal from a positive flux value to a negative value of flux causes a "full loop" energy loss. If the flux field only increases from zero to some maximum value and then decreases back to approximately zero when the phase winding is commutated, then a "minor" hysteresis loop is produced in the iron core.

Induction motors and permanent magnet motors require bi-directional current switching resulting in a full magnetic flux reversal in the iron core. Thus, the magnetic iron experiences heating due to full magnetic flux reversal hysteresis loops. However, SR motors, having rotors comprising magnetically permeable material and operating under uni-directional current passing through energized stator phase windings, only experience heat losses produced by minor hysteresis loops resulting from the flux linkage cycling between a near null value to a peak value and then decreasing back to the near null value. Therefore, the SR motors generally operate with less iron losses per commutation cycle than induction motors and permanent magnet motors.

SR motors having rotors comprising magnetically permeable materials are indeed desirable for their relatively lower heat losses. Nevertheless, it is desirable to further reduce the heat losses in an SR motor.

In my U.S. Pat. No. 4,883,999, an SR motor is described that significantly reduces the losses experienced in back iron of the motor. In that patent, stator windings for the same phase are located adjacently on the stator. In my U.S. Pat. No. 5,111,095, an SR motor is described that reduces the energy loss experienced in the back iron of the motor and provides for a structure wherein two phases are simultaneously energized to provide enhanced torque.

SUMMARY OF THE INVENTION

It is a general object of the present invention to provide an SR motor capable of operating over a very wide rotations-per-minute range with a very high, low-speed starting torque as well as a very high speed capability.

It is a further object of the invention to achieve the above wide high performance operating speed range with high efficiency.

It is yet another object of the invention to achieve the above wide high performance operating speed range with low torque ripple.

It is yet another object of the invention to achieve the above wide high performance operating speed range with low internal heating losses.

It is yet another object to provide an SR motor having reduced audible noise.

Another object of the present invention is to provide a lower cost SR motor.

The above and other objects are met in a polyphase split-phase switched reluctance (SR) motor comprising a plurality of rotors and a plurality of stators. The stators are separated by a radial gap from the rotors. The windings of the stators are collectively energized by a set of phases provided by a power converter. However, each stator in the set of stators is associated with a plurality of energizing phases comprising less than the set of phases provided by the power converter.

In accordance with one aspect of the present invention, an even number of total phases are distributed evenly between a first stator assembly and a second stator assembly. Phase windings associated are connected to a driver circuit such that excitation of phase windings occurs in an alternating manner between the first and the second stator assemblies.

By distributing the phases between a plurality of stators, the effective mass subject to each commutation is reduced. Furthermore, the preferred embodiment provides desirable torque characteristics while reducing the total number of commutations executed by the motor per revolution. As a result, switching losses caused by the creation and breaking down of magnetic fields is decreased substantially in comparison to comparable known motors.

Furthermore, since the duty cycle of each stator is reduced by the distributing of the phases among a plurality of stators, each stator has a significant rest period. The rest period permits cooling, and therefore the potential for overheating is decreased.

Various energization schemes may be employed to power an SR motor according to the invention. Using a polyphase source, the SR motor may operate with only one phase substantially on at a time. However, in practical operation, the energizing of the phases is overlapped in order to compensate for delays in turning on and off the phases to achieve very low torque ripple.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE DRAWINGS

Figure 1A:
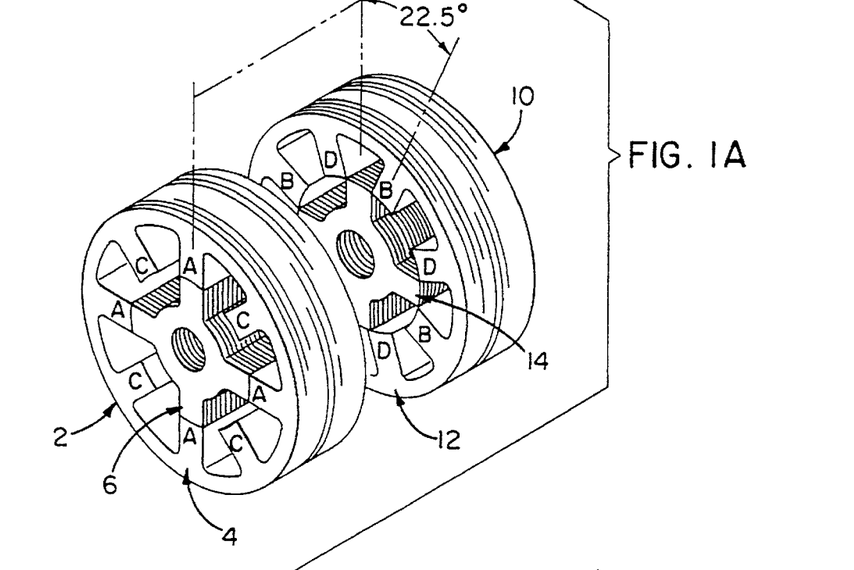
FIG. 1A is a perspective illustration of the structure and relative orientation of the stators and rotors of an SR motor in accordance with an illustrative embodiment of the invention.

Turning to the drawings and referring first to FIG. 1A, a perspective illustration is provided of an SR motor embodying the present invention. A first stator 2 is preferably formed from a stack of laminations made of magnetically permeable steel alloy. The first stator 2 includes eight (8) stator poles labelled A or C in accordance with an associated one of two phase windings for the first stator 2. As illustrated in FIG. 1A, the stator poles extend radially inwardly from an annular yoke 4 and are evenly spaced about the inner circumference of the yoke from adjacent rotor poles by 45 degrees. Furthermore, the width of each stator pole on the end proximate the rotor poles is equal to the gap between the ends proximate the rotor poles of adjacent stator poles.

Figures 1B, 6:
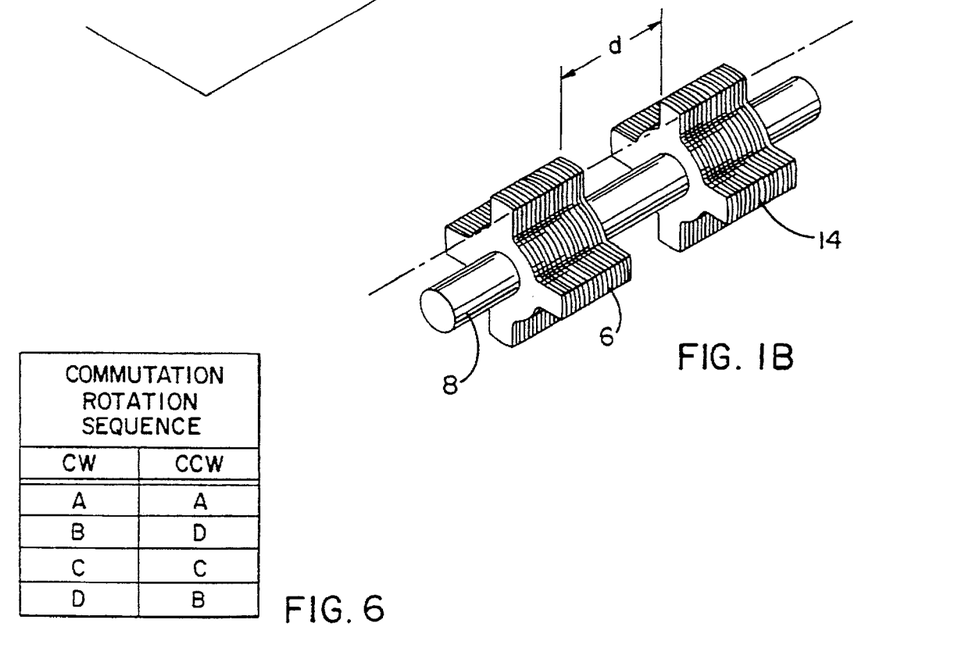
FIG. 1B is an isolated perspective illustration of the rotor assembly of an SR motor mounted on and supported by a drive shaft in accordance with the illustrative embodiment of the invention.
FIG. 6 is a table summarizing the commutation sequence for the phase windings A, B, C and D of the stator for achieving clockwise and counter-clockwise rotation of the rotor.

Continuing with the description of FIG. 1A, a first rotor 6 is matched with the first stator 2 to produce torque on an axle 8 illustrated in FIG. 1B. The axle 8 is formed from steel or other known suitable materials. The first rotor 6 comprises a stack of laminations made of a magnetically permeable iron alloy. As depicted in FIG. 1A, the first rotor 6 comprises four (4) rotor poles. The four (4) rotor poles extend radially outwardly from the axis of rotor rotation. The four (4) rotor poles of the first rotor 6 are evenly spaced 90° from adjacent rotor poles. The length of a rotor pole should be at least 1.5 times the width of the rotor pole at the end of the rotor pole proximate the stator poles in order to achieve a high inductance ratio (between a maximum inductance and minimum inductance). Furthermore, the width of the rotor poles should be slightly greater than the width of the stator poles.

In the illustrative embodiment of the present invention, the SR motor includes a second stator 10 having the same construction as the first stator 2. The second stator 10 comprises an annular yoke 12 and eight (8) evenly spaced stator poles labelled B or D in accordance with an associated one of two phase windings for the second stator 10. The actual phase windings have been omitted from FIG. 1A in order to simplify the drawing. A second rotor 14 of same construction as the first rotor 6 is mounted on the axle 8 as illustrated in FIG. 1B and matched with the second stator 10. An axial gap between the first stator 2 and the second stator 10 having a distance d provides a high reluctance path between the first stator 2 and the second stator 10. The distance d is determined by the space required to accommodate the end windings of the stator poles. As shown in FIG. 1B, the first rotor 6 and the second rotor 14 are also separated by a substantially same spacing along the axle 8 as the distance d between the stator 2 and stator 10.

In the illustrative embodiment of the present invention, the stator poles of the second stator 10 are rotationally skewed in relation to the stator poles of the first stator 2 by 22.5°. As explicitly shown in FIG. 1B, the rotor poles of the second rotor 14 are radially aligned with the rotor poles of the first rotor 6. Therefore, when the four rotor poles of the first rotor 6 are in maximum alignment with four stator poles for one of the two phases of the first stator 2 (phase A in FIG. 1A), the four rotor poles of the second rotor are out of maximum alignment with the stator poles of each of the two phases of the second stator 10 by 22.5°. As will be apparent from FIG. 1A, when the axle 8 is rotated 22.5° thus rotating each of the rotors by 22.5°, the first rotor is positioned 22.5° out of maximum alignment with each of the two phases of the first stator 2, and the second rotor 14 is placed in maximum alignment with four stator poles for one of the two phases of the second stator 10.

As will be appreciated by those skilled in the art of brushless motor design, the inductance and torque characteristics of the motor are influenced by a number of rotor and stator physical design factors including the dimensions of the poles of the rotors and stators, the amount of overlap between rotor poles and stators, and the radial gap between aligned rotor and stator poles. Though the rotor and stator poles in the illustrative embodiment of the invention have been shown to have aligned side edges when in maximum alignment and have completely unaligned edges when in maximum disalignment, this is not a requirement for practicing the present invention.

Figure 2A:
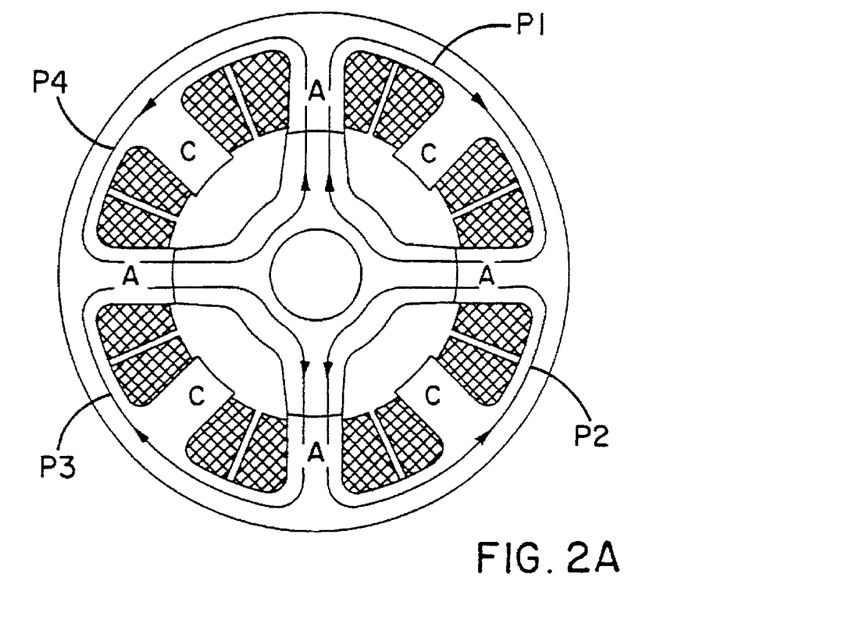
FIGS. 2A and 2B are axial cross-sectional views of front and rear stator and rotor pairs illustrating the flux paths created by the stators and rotors when phase windings A and B are energized, and the rotors are in the position illustrated in FIG. 1A.

As previously explained, the illustrative embodiment of the SR motor includes four phases for energizing the stator poles. The four phases, identified by the letters A, B, C and D are each associated with four (4) stator poles identified in the drawings by a one of the phase identification letters. Turning now to FIG. 2A, in the illustrative embodiment of the present invention the polarity of the phase windings (indicated in FIG. 2A by cross-hatching) for a same phase are reversed for adjacent same phase stator poles while opposite stator poles (top/bottom and left/right) are the same polarity thereby creating four (4) flux paths when a one of the phases is energized in a stator. As a consequence, the rotors are pulled from four directions by an energized phase. The pulling from four directions reduces the effect of forces tending to reshape the stator yoke from its intended circular shape. This reshaping of the stator yoke is a significant source of audible noise during the operation of conventional switched reluctance motors.

Taking for example phase A for the first stator 2 in FIG. 2A, when the rotor poles of the first rotor 6 are in maximum alignment with the stator poles of an energized phase A of the first stator 2 flux paths $P_1$ $P_2$ $P_3$ and $P_4$ are formed in the first stator 2. The flux paths $P_1$ $P_2$ $P_3$ and $P_4$ are in a state of maximum inductance. It will be appreciated by those skilled in the art that no torque is exerted when the rotor poles are aligned with energized stator poles.

Figure 2B:
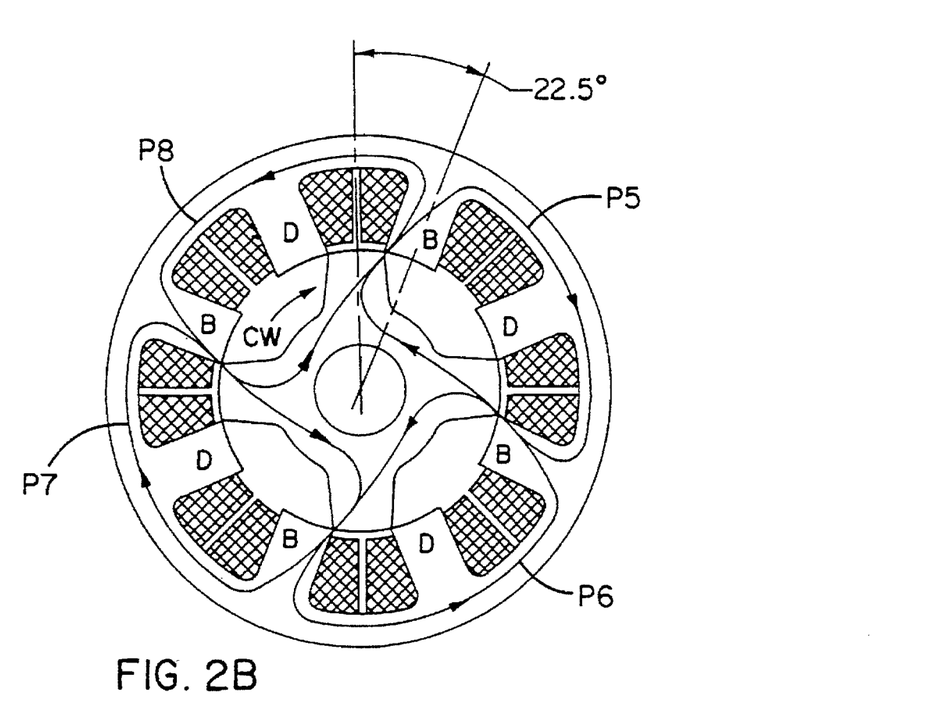

Turning now to FIG. 2B, the flux paths $P_5$ $P_6$ $P_7$ and $P_8$ are illustrated for an energized phase B in the second stator 10 when the rotor poles are unaligned with the stator poles associated with the energized phase B. When in the unaligned position, the flux paths $P_5$ $P_6$ $P_7$ and $P_8$ are characterized by a relatively low inductance in comparison to the inductance value for the flux paths arising from aligned rotor poles and stator poles (as illustrated in FIG. 2A). As will be appreciated by those skilled in the art of switched reluctance motors, the energization of phase B while the second rotor 14 is in the illustrated position in FIG. 2B will create a rotational force causing the rotor to turn in a clockwise direction as the rotor and energized stator poles seek a position of maximum inductance. Maximum inductance is attained when the rotor poles and the energized phase B stator poles are aligned.

Figure 3:
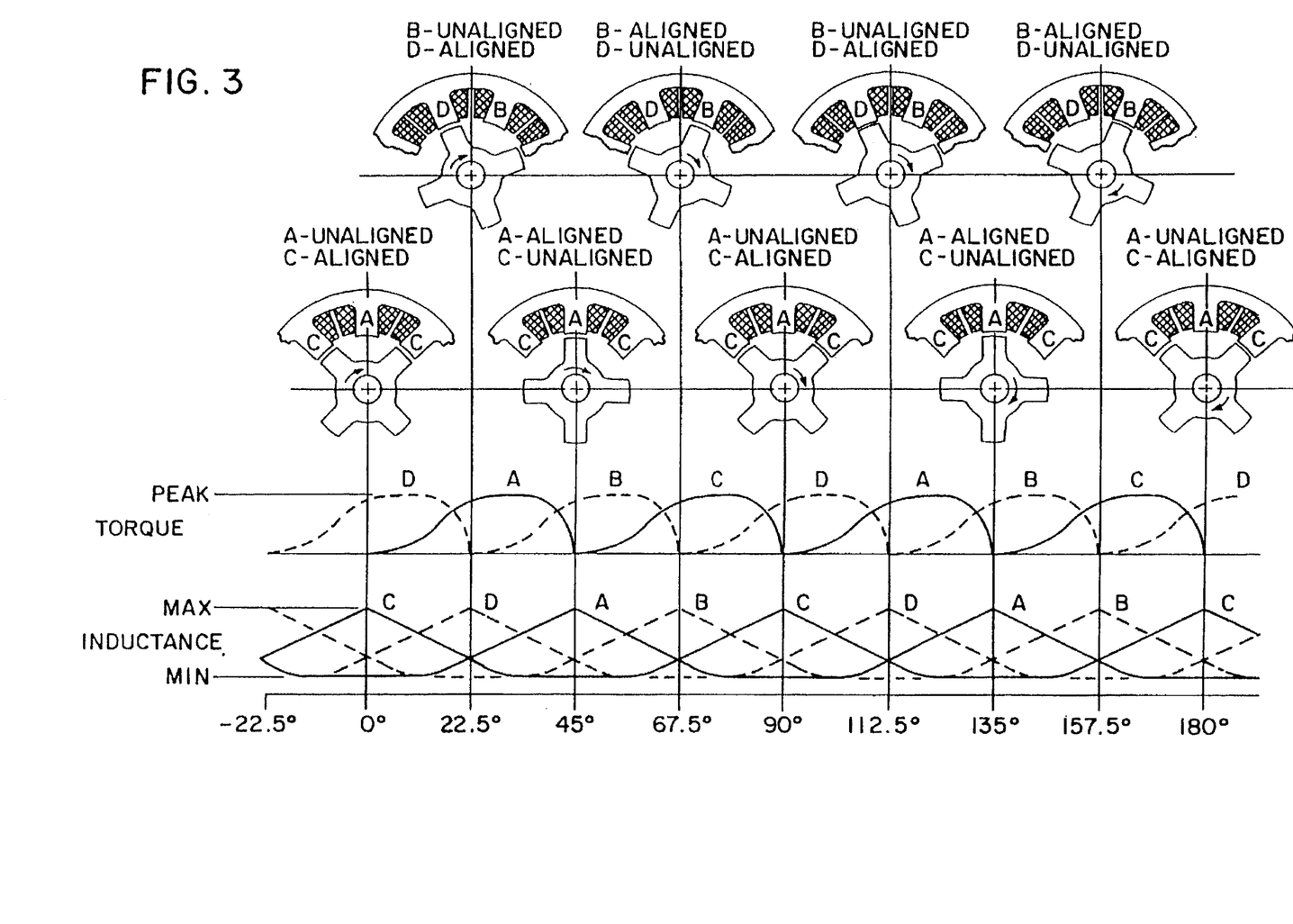
FIG. 3 is an illustrative graphical depiction of the inductance and torque characteristics of the switched reluctance (SR) motor depicted in FIG. 1A as the rotor teeth are rotated into positions of alignment and disalignment with energized stator poles.

Turning now to FIG. 3, illustrative inductance and torque curves are shown for a switched reluctance (SR) motor of the type depicted in FIG. 1A. The inductance and torque curves graphically illustrate the relationship between rotor/stator pole alignment and inductance and torque (produced by a fully energized phase) as a rotor assembly for an SR motor of the type illustrated in FIG. 1A rotates 180° in a clockwise direction. In order to carry out the 180° rotation, the SR motor progresses through two four-phase commutation sequences (of phases A, B, C and D). In order to make one full rotation (360°), the four-phase commutation sequence is performed four times.

It is noted that the stator and rotor drawings in FIG. 3 show fragmented views of the aligned one of the two (2) rotor and stator pairs at a particular rotational position of the illustrative SR motor. However, all the stator pole positions are easily determined in view of the illustrated rotor and fragmented stator and the overall stator assembly and rotor assembly configuration illustratively depicted in FIGS. 1A, 1B, 2A and 2B.

With respect to the torque versus rotor angle curves in FIG. 3, it is assumed that the phases are energized to produce clockwise rotation on the rotors. Furthermore, it is assumed that a phase is energized when the rotor poles are 45° short of maximum rotational alignment with the stator poles for the phase, and an energized phase fully de-energizes when the rotor poles are in maximum rotational alignment with the stator poles for the phase. It will be understood by those skilled in the art that a limitless number of phase energization schemes may be used to drive the four phase windings of the four phase motor SR motor illustratively depicted in FIG. 1A. Furthermore, the torque and inductance curves are shown in broken lines for the B and D phases in order to more easily distinguish those curves from the overlapping curves for the A and C phases of the illustrative example of an SR motor embodying the present invention.

When the first rotor 6 and second rotor 14 are in a rotational position identified in FIG. 3 as 0°, the poles of the first rotor 6 are in full alignment with the phase C stator poles. Therefore, the inductance is at a maximum and the torque is at a minimum with respect to the phase C stator poles. Both inductance and torque are minimized with respect to the phase A stator poles. Inductance is increasing and torque exerted by the energized phase D stator poles is near a maximum value.

At the 22.5° rotor position, inductance is increasing and torque exerted by the energized phase A stator poles is approaching a peak value. Also, as illustrated in the inductance and torque curves in FIG. 3, at the 22.5° rotor position, inductance is maximized and torque is minimized for the phase D stator poles. Both inductance and torque are minimized with respect to the phase B stator poles.

As the rotor progresses to the 45° rotor position, inductance is maximized and torque is minimized for the phase A stator poles. Also, as the rotor passes through the 45° position, inductance is increasing and torque exerted by the energized stator poles is approaching a maximum value for phase B stator poles. Torque and inductance are minimized for the phase C stator poles. The remaining inductance and torque curves for the B, C, and D stator poles as the rotors progress through the 67.5°, 90°, 112.5°, etc. positions will be understood by those skilled in the art and therefore are not described further herein.

Figure 4:
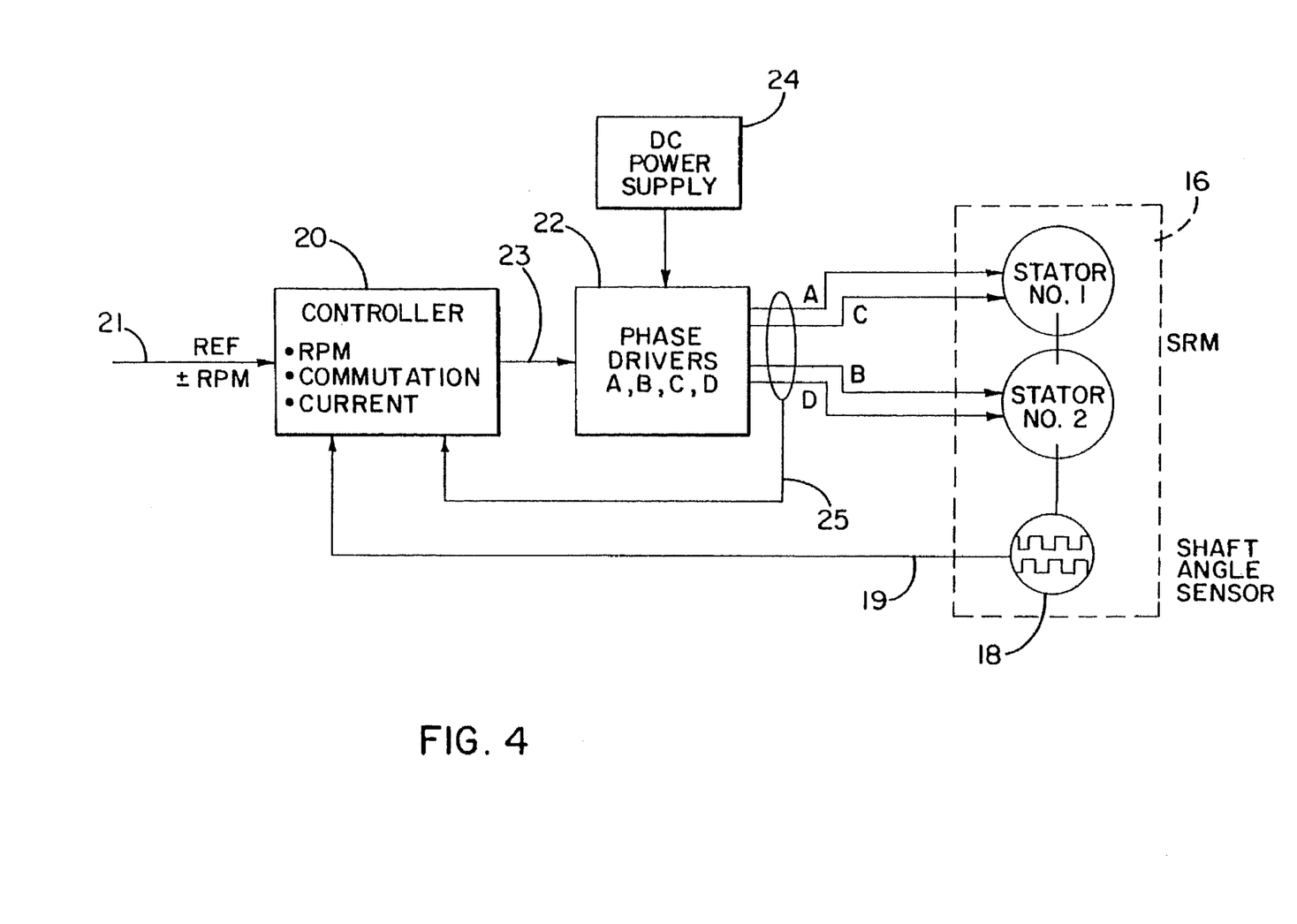
FIG. 4 is a schematic block diagram of an exemplary four-phase control and power system for exciting an SR motor (16) in accordance with the illustrative embodiment of the invention.

FIG. 4 provides a schematic diagram for a four phase SR motor 16 and control system. The control system is conventional in design and includes a rotor position sensor 18 that delivers pulses via line 19 to a controller 20 indicating the current rotor position. The signals on line 19 are also used by the controller 20 to calculate the rotational velocity of the SR motor 16. The controller 20 also receives input signals on line 21 in a known manner for adjusting a set point of the rotational speed of the motor. The controller 20 in turn transmits control signals via lines 23 to phase drivers 22 for the A, B, C and D phases of the SR motor 16. The signals transmitted on lines 23 control the turning on and off of power transistors in the phase drivers 22. The phase drivers 22, illustrated in greater detail in FIG. 5 described below, are powered by a DC Power Supply 24. In accordance with the stator winding configuration of the illustrative embodiment of the invention in FIG. 1A, the lines corresponding to the A and C phase windings are coupled to a Stator #1, and the lines corresponding to the B and D phase windings are coupled to a Stator #2 in the SR motor 16.

Feedback signals corresponding to the current passing through each of the phases A, B, C and D are transmitted on lines 25 to the controller 20. The feedback signals on lines 25 are utilized to control phase drivers in order to minimize torque ripple and to prevent excessive current from passing through the phase drivers.

Figure 5:
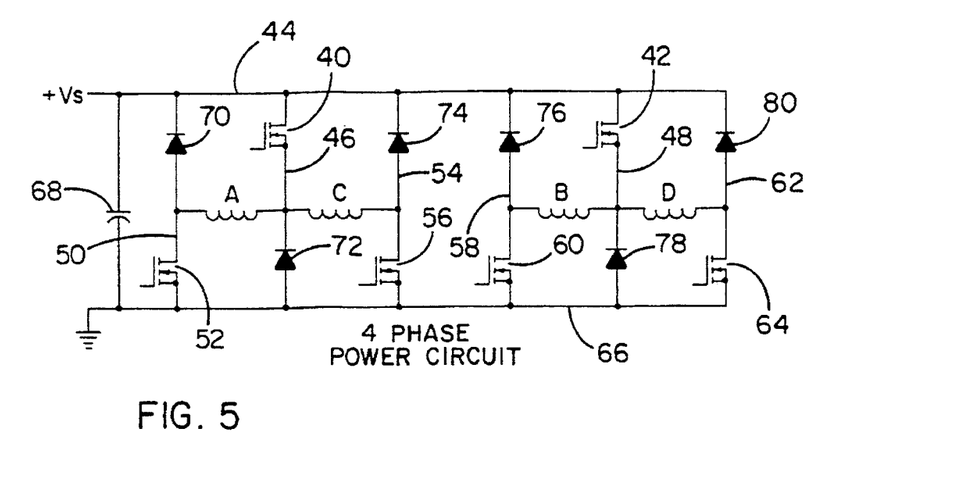
FIG. 5 is a schematic circuit diagram of a particular four-phase circuit for the phase drivers of FIG. 4.

Turning now to FIG. 5, a schematic circuit diagram is illustrated for a phase driver circuit for energizing the phase windings A, B, C and D of the four phase motor illustratively depicted in FIG. 1A. Two upper power transistors 40 and 42 of known construction are connected via line 44 to $V_s$. Power transistor 40 is connected via line 46 to inductors A and C, corresponding to the phase A and phase C stator phase windings. Power transistor 42 is connected via line 48 to inductors B and D, corresponding to the phase B and phase D stator phase windings. The upper transistors 40 and 42 regulate the current associated with inductors A and C, and B and D respectively by regulating the duty cycle of the upper transistors 40 and 42. If too great a current is detected by the controller 20 through one of the phases, then one of the upper transistors 40 or 42 is shut off to reduce the current through the phase. If the current level drops below a desired level in one of the phases, then the gate voltage of one of the upper transistors 40 and 42 is adjusted in order to increase current through the phase.

Inductor A is connected via line 50 to a commutating power transistor 52 of known construction. Inductor C is connected via line 54 to a commutating power transistor 56. Inductor B is connected via line 8 to power transistor 60, and inductor D is connected via line 62 to power transistor 64. Each of the power transistors 52, 56, 60, and 64 are connected to ground via line 66. The gates of each of the power transistors 52, 56, 60 and 64 are separately connected to a corresponding control line of the lines 23 from the controller 20 (in FIG. 4).

A capacitor 68 is attached in parallel to the commutated inductor circuits to protect against transient voltage spikes which could damage the semiconductor circuitry. Furthermore, diode 70, inserted between $V_s$ on line 44 and one end of the inductor A on line 50, and diode 72, inserted between ground on line 66 and the other end of the inductor A on line 46, provide a path for dissipating the stored energy in the inductor A when the power transistor 52 and/or the upper transistor 40 are switched off. Diode 74 is similarly attached to $V_s$ on line 44 and one end of the inductor C on line 54 in order to provide an energy dissipation path for the inductor C through diodes 72 and 74. Diodes 76, 78, and 80 are connected to the portion of the phase driver circuit associated with phases B and D (in manner analogous to the connection of diodes 70, 72 and 74) in order to dissipate the stored energy in the inductors B and D when the transistors 42, 60 and 64, associated with phases B and D, are switched off.

Having described the hardware of the illustrative embodiment of the SR motor of the present invention, attention is now directed to the control of the circuitry to cause the rotor to rotate about the axis defined by the axle 8. Turning first to FIG. 6, the commutation sequences are summarized for clockwise and counter-clockwise rotation. Turning to the column labelled "CW," clockwise rotation is attained in the SR motor illustrated in FIG. 1A by energizing the phase A winding, then phase B winding, then phase C winding, and then phase D winding. The commutation sequence then begins again with the energizing of phase A. Counter clockwise rotation is achieved by energizing the phases in a reverse order in accordance with the phase progression depicted in the column labelled "CCW" (i.e., A, D, C and B).

Figure 7:
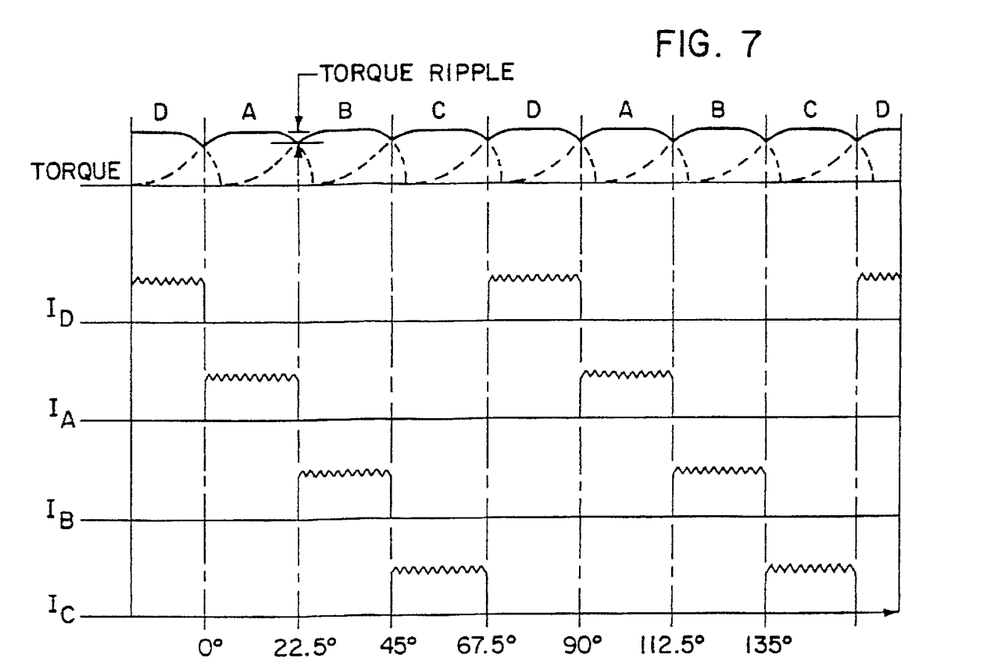
FIG. 7 is a series of timing diagrams relating the torque characteristics of the rotating rotors to the commutated current flowing through the four phases of the illustrated four-phase motor according to the present invention.
Figure 8A:
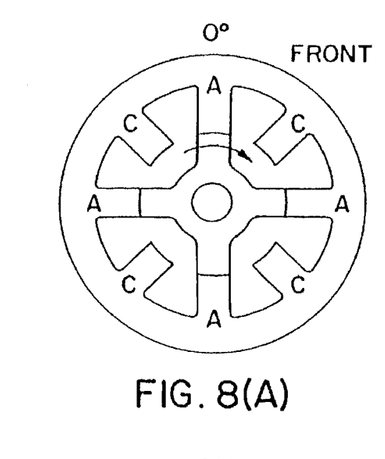
FIG. 8 is a series of cross-sectional snap-shot illustrations (A) through (P) of the front and rear rotor/stator combinations illustrating each aligned position of the stator and rotor poles for the front and rear yokes of the stator in FIG. 1A for a complete revolution of the rotor in accordance with the illustrative embodiment of the present invention.
Figure 8B:
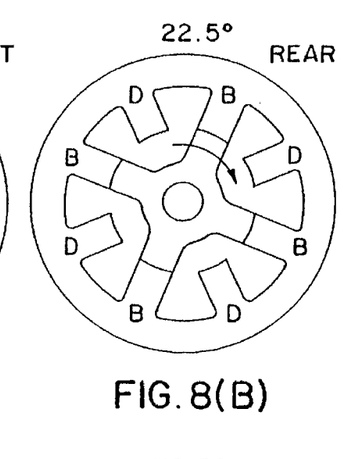
Figure 8C:
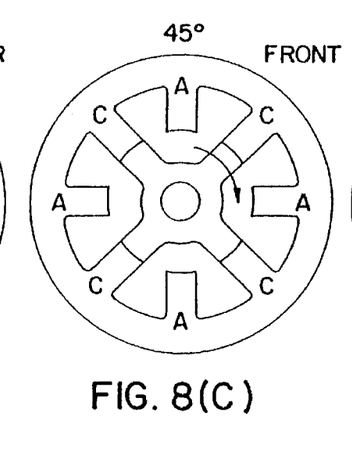
Figure 8D:
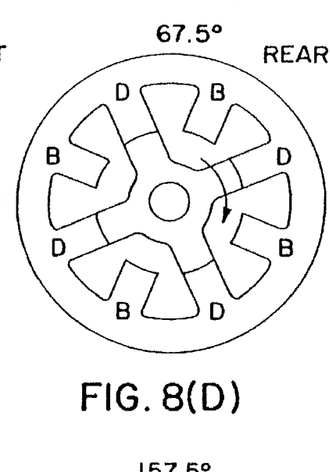
Figure 8E:
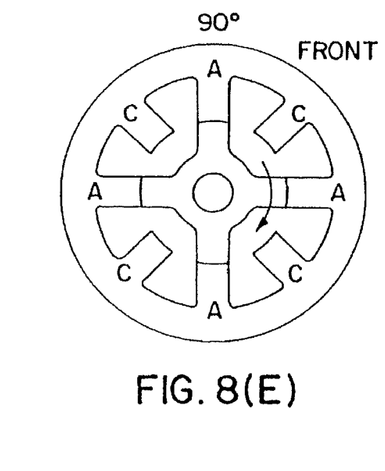
Figure 8F:
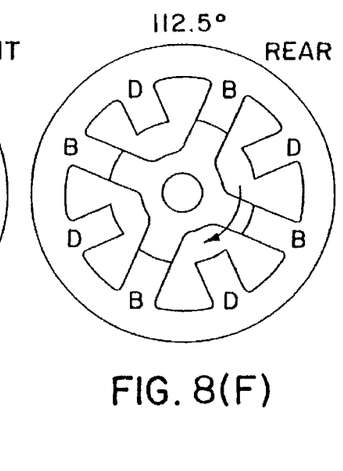
Figure 8G:
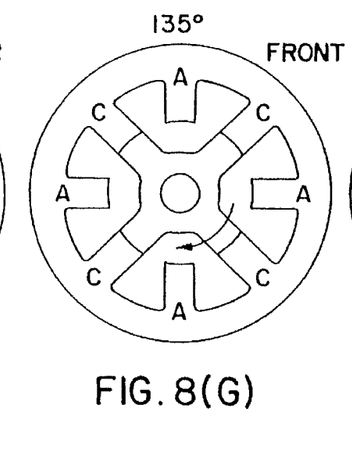
Figure 8H:
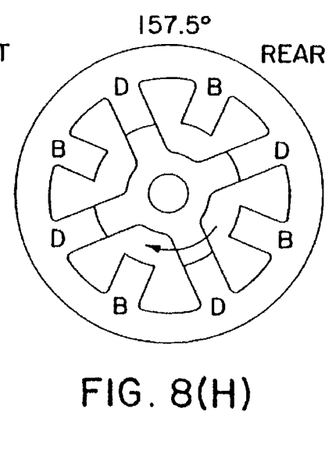
Figure 8I:
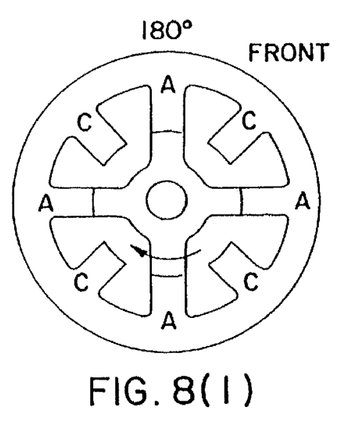
Figure 8J:
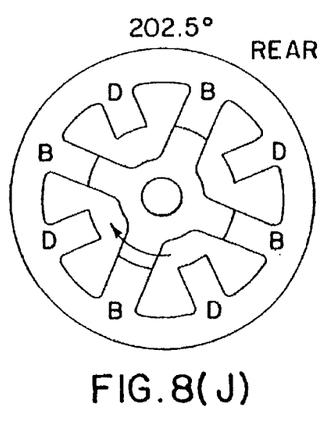
Figure 8K:
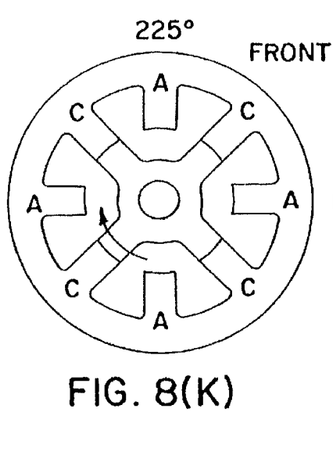
Figure 8L:
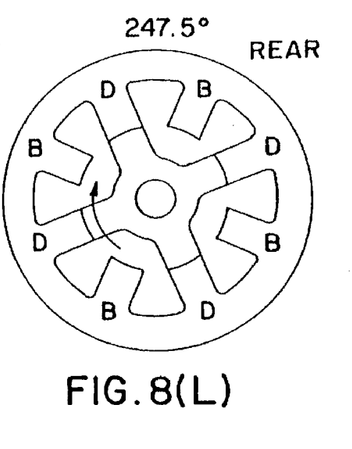
Figure 8M:
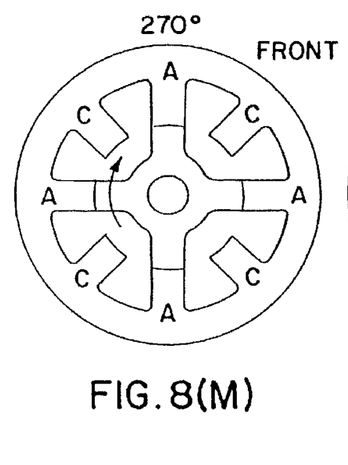
Figure 8N:
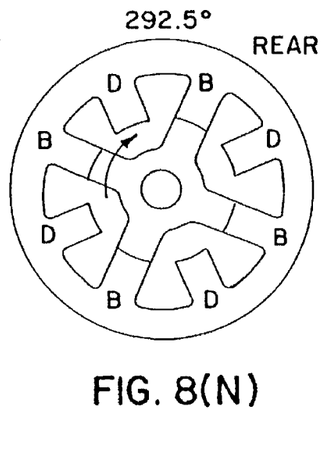
Figure 8O:
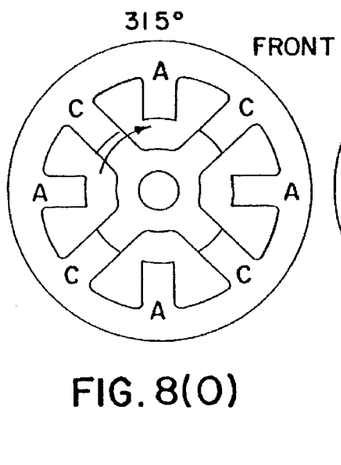
Figure 8P:
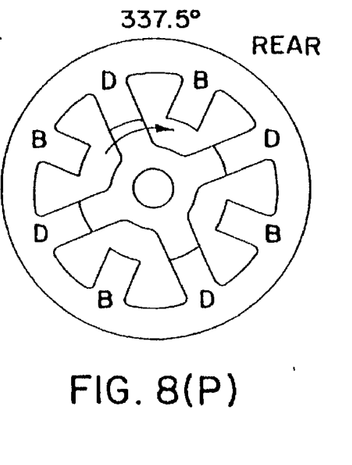

FIG. 7 comprises a set of waveforms relating the rotational position of the rotor assembly to: (a) the current flowing through energized phase windings, and (b) the torque applied to the rotor assembly to provide clockwise rotation arising from the energized phase windings. Only two iterations of the phase commutation sequence for clockwise motion are illustrated by the waveforms in FIG. 7. A single revolution requires four iterations of the commutation sequence illustrated in FIG. 7.

As illustrated by the current waveforms for phase windings $I_A$, $I_B$, $I_C$, and $I_D$, the power transistors 52, 56, 60 and 64 (of the driver circuit illustrated in FIG. 5) are commutated so that a substantial current is flowing through a stator winding during 22.5° of rotation of the rotor assembly during each commutation sequence. The difference between the maximum and minimum torque applied to the rotor assembly as the rotor assembly rotates is referred to as torque ripple. One objective when controlling an SR motor is to minimize torque ripple which in turn leads to smoother mechanical operation of an SR motor.

In the low RPM operating region of the SR motor embodying the present invention, low torque ripple is achieved by initially energizing a stator winding by substantial current flow when rotor poles are positioned more than 22.5° before maximum rotational alignment with the energizing stator poles. The power transistor corresponding to an energized stator pole is commutated "off" at a point of rotation of the rotors so that the current passing through the energized phase winding is near zero when the rotor poles approach maximum alignment with the de-energized stator poles. The portion of the torque diagram represented by dashed lines corresponds to the portion of the torque potential associated with each phase which is not used because the power transistor associated with the phase is commutated to the "off" position. As a result, a relatively smooth torque curve is produced for the four-phase SR motor embodying the present invention when operating at a low rotational velocity under the phase energization scheme depicted in the current waveforms of FIG. 7.

In the illustrated current diagrams, the duty cycle for the adjacent energized phases does not overlap and the current is shown to drop off very sharply. As will be appreciated by those skilled in the art of SR motor phase driver circuit design, the inductors cannot be instantaneously turned on and off, and therefore the current waveforms illustrated in FIG. 7 (having very sharp "on" and "off" points) cannot be achieved at high operating rotational velocities. Therefore, during high rotational velocity operation, the duty cycles of adjacent phases overlap and the total torque is a sum of the torque exerted by each energized overlapping phase.

The rotation angle in which a stator phase winding can be energized to provide useful torque is 45°. Thus, in an alternative embodiment of the present invention, each of the four phases is energized for a full 45° of rotation. Energizing a phase begins when the rotor poles are 45° before maximum alignment with the energizing phase. An energized phase is commutated "off" when the stator poles for the energized phase are in maximum alignment with the rotor poles. In such a scheme, two phases are energized at a time in a staggered fashion.

Turning now to FIG. 8, the progression of an aligned pair of rotors in an SR motor having a pair of stators disaligned by 22.5° (as in the SR motor in FIGS. 1A and 1B) is schematically illustrated for one complete clockwise revolution of the illustrative SR motor of the present invention in a series of 16 snapshot drawings labeled (a) through (p). Each snapshot view corresponds to when a one of the rotors 6, 14 is in alignment with the stator poles associated with one of the four phase windings of the stators 2, 10 (labelled FRONT and REAR respectively).

Figure 9A:
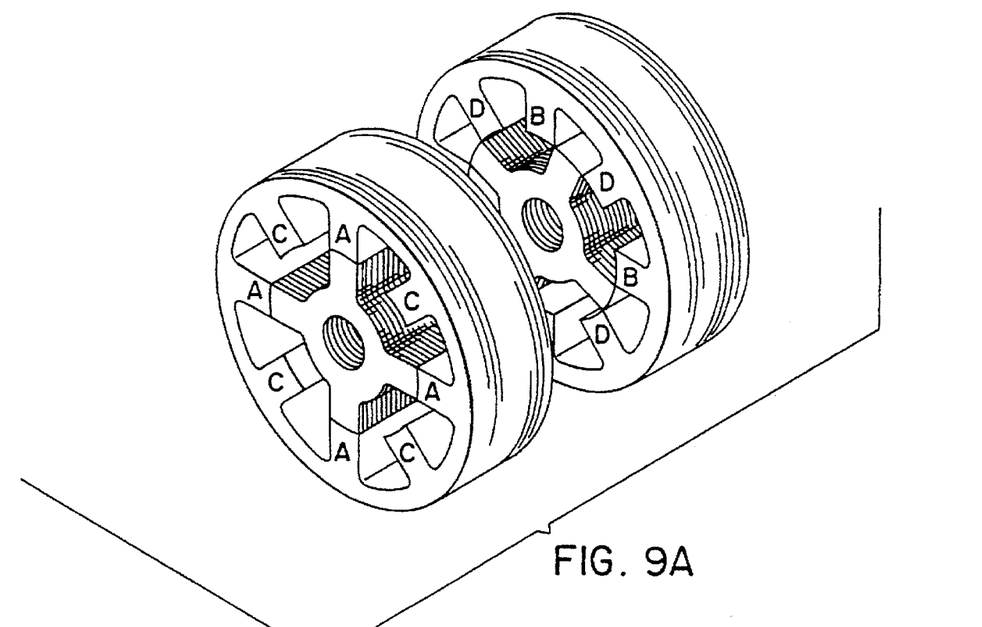
FIG. 9A is a perspective illustration of the structure and relative orientation of the stators and rotors of an SR motor in accordance with an alternative embodiment of the invention.
Figure 9B:
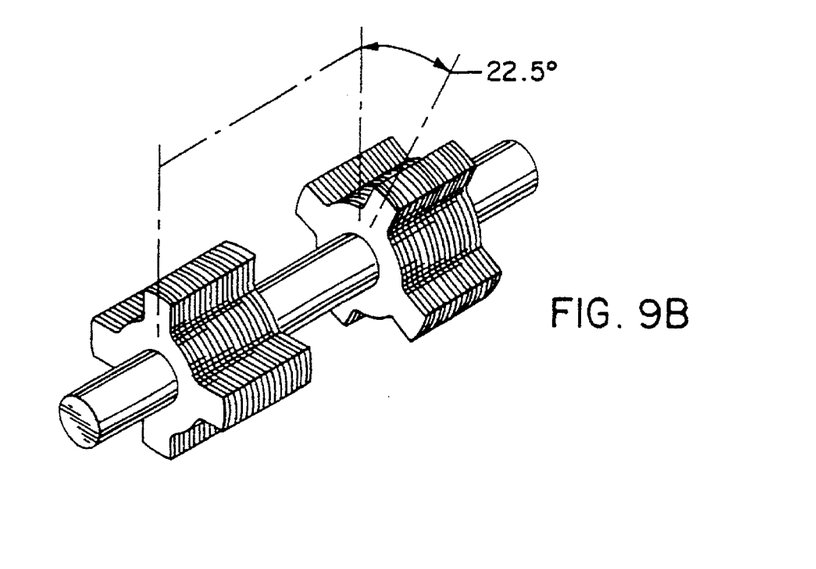
FIG. 9B is an isolated perspective illustration of the rotor assembly of an SR motor mounted on and supported by a drive shaft in accordance with an alternative embodiment of the invention.

Having described the structure and operation of an illustrative embodiment of the present invention as well as modifications thereto, attention is now directed to FIGS. 9A and 9B illustrating an alternative SR motor wherein the stator poles of a first stator 90 are rotationally aligned with the stator poles of a second stator 92. Specifically, the phase A stator poles are rotationally aligned with the phase B stator poles. The phase C stator poles are rotationally aligned with the phase D stator poles. However as shown in FIG. 9B, in accordance with an alternative embodiment of the present invention, the rotation orientation of the rotor poles of a first rotor 94 are skewed 22.5° with respect to the rotor poles of a second rotor 96 on axle 98.

Rotating the rotor assembly in a clockwise direction for the SR motor illustrated in FIGS. 9A and 9B is accomplished by commuting the stator phases in the sequential order of phase A, phase D, phase C, and phase B. The commutation sequence is then repeated starting with phase A. Counterclockwise rotation is accomplished by commuting the phase windings associated with the labeled stator poles in the order of phase A, phase B, phase C, and phase D.

Figure 10A:
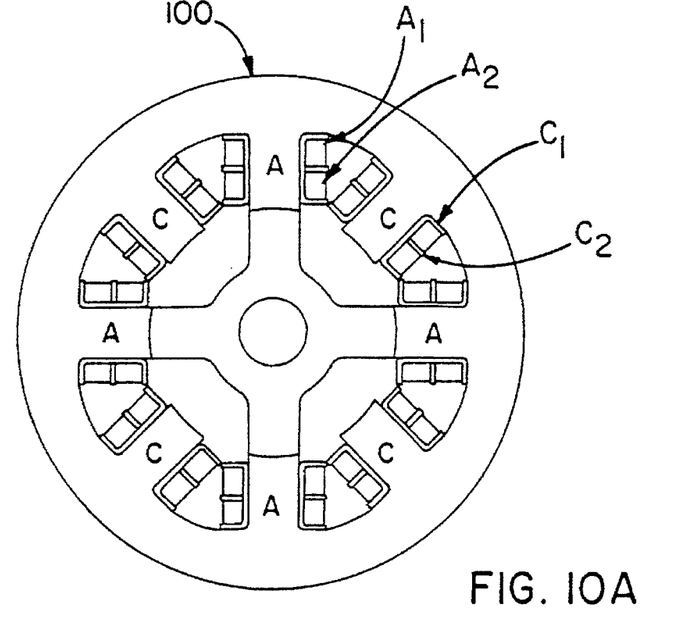
FIGS. 10A and 10B are axial cross-sectional views of the front and rear stator yokes and corresponding rotors, respectively, for an SR motor in accordance with an alternative embodiment of the invention.

Turning now to FIGS. 10A, 10B, 11 and 12, another alternative embodiment of the four phase SR motor illustrated in FIG. 1A is provided having an enhanced fail-safe architecture. While the orientation of the first stator 100 and the second stator 102 in relation to the first rotor 104 and the second rotor 106 remain unchanged from FIG. 1A, each stator pole is provided two, independently controlled, stator phase windings. For example, as indicated in FIG. 10A, each of the four stator poles labeled A is associated with a stator phase winding $A_1$ and a stator phase winding $A_2$. Each of the four stator poles labeled C is associated with a stator phase winding $C_1$ and a stator phase winding $C_2$. The sets of four stator poles in FIG. 10b, identified by the labels B and D, are each similarly associated with two independently controlled stator phase windings.

Figure 10B:
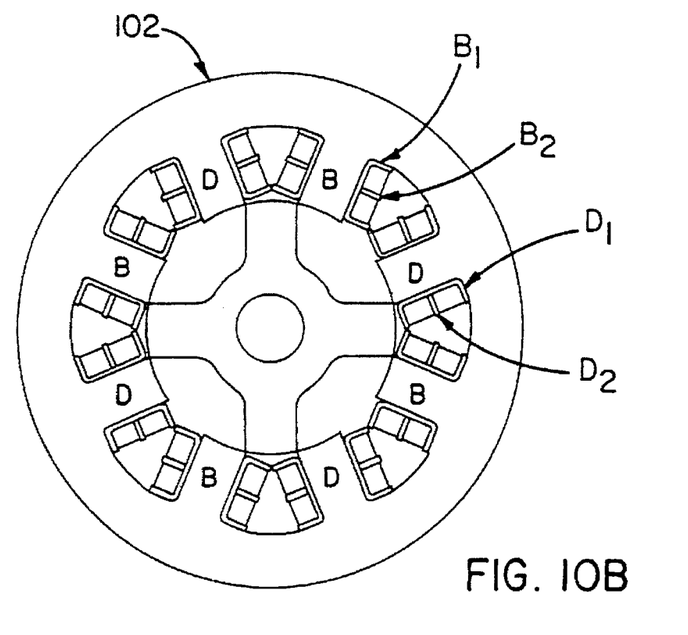
Figure 11:
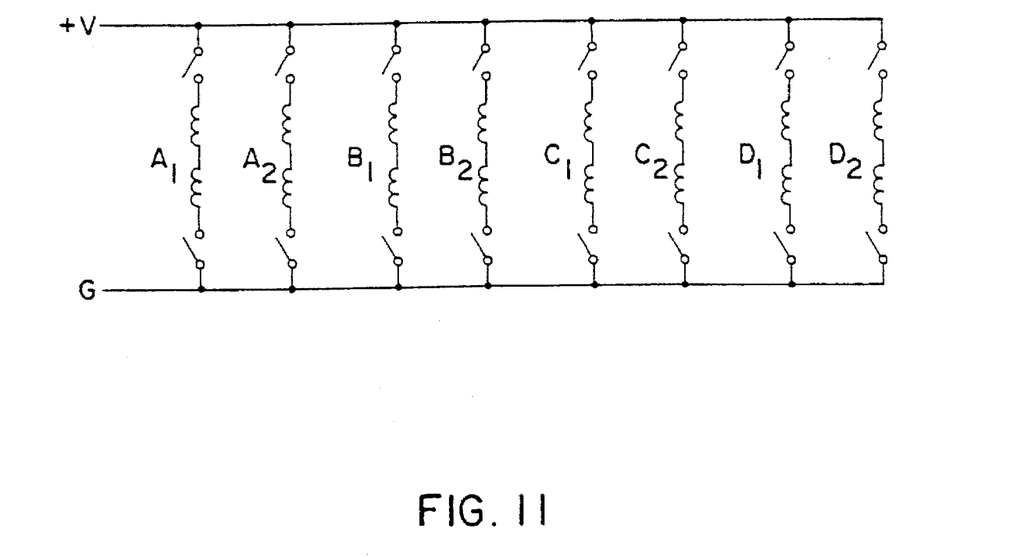
FIG. 11 is a schematic circuit diagram of the phase drivers for the alternative embodiment of the invention illustrated in FIGS. 10A and 10B.

Turning now to FIG. 11, an electrical schematic circuit diagram is provided of a phase driver circuit in accordance with the alternative embodiment of the invention depicted in FIGS. 10A and 10B. Each of the four pairs of phase windings is connected in parallel to $V_s$ and ground by an upper transistor and a lower, commutating transistor. Though not shown in FIG. 11, the phase driver circuit includes a capacitor and diodes connected to the phase windings (in a manner analogous to the diode connection scheme in FIG. 5) in order to de-energize an energized phase winding of the type included in FIG. 5.

Alternative phase driver circuits will of course be known to those of ordinary skill in the art. For example, the upper transistors may be shared between phase windings in a manner similar to the embodiment illustrated in FIG. 5. However, sharing an upper transistor detracts from the goal of minimizing the effect of a transistor failure upon the operation of the motor since the failure of an upper transistor will affect the operation of two (2) phase windings. However, because only half of each of the two phases is affected in a phase winding configuration of the type illustrated in FIGS. 10A and 10B, the shared upper transistor circuit configuration is still very desirable.

Figure 12:
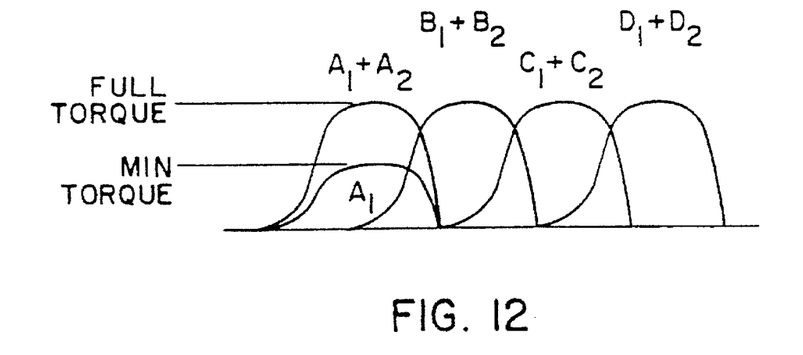
FIG. 12 is a graphical illustration of the torque developed by a four phase SR motor having a rotor and stator configuration illustrated in FIGS. 10A and 10B in a normal and partially failing mode of operation.

As will be readily apparent from the drawing in FIG. 11, the failure of one of the switches associated with, for example, phase winding $A_2$ will result in only a decrease in the torque provided by phase A rather than a complete loss of torque from phase A since the phase winding $A_1$ is unaffected by the failure of a switch associated with the phase winding $A_2$. As illustrated in FIG. 12, the torque resulting from the energized $A_1$ phase winding, though considerably less than the torque exerted by simultaneously energized stator poles $A_1$ and $A_2$, reduces the effects of torque ripple and may prevent breakdown of the motor in instances where complete failure of the motor would have catastrophic consequences.

Figure 13:
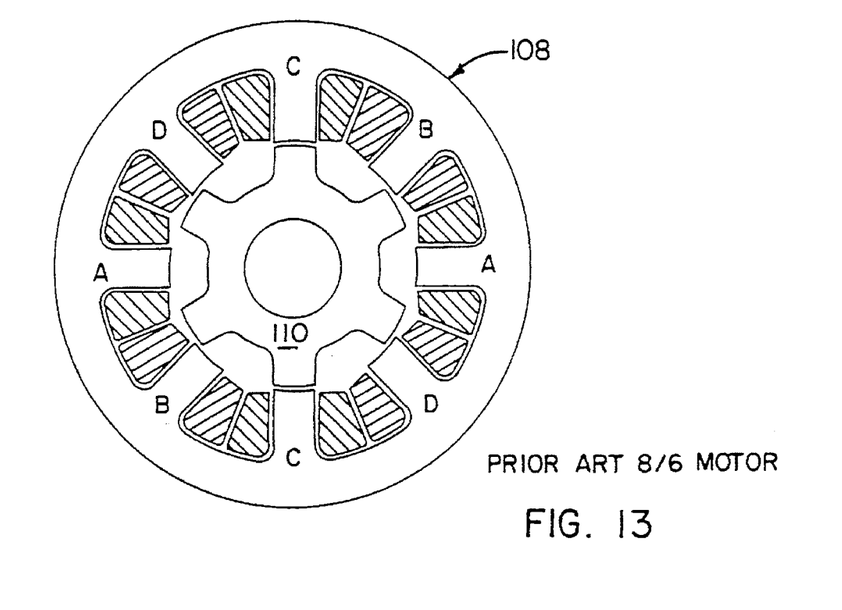
FIG. 13 is an axial cross-sectional view of a well known 4-phase 8/6 SR motor.

Having described various illustrative and alternative embodiments of the present invention, the SR motor illustrated in FIG. 1A will be compared to the well known 8/6 SR motor illustrated in FIG. 13. The 8/6 SR motor includes a stator 108 having eight stator poles. The eight stator poles are divided into four pairs of stator poles. The stator poles associated with phases A, B, C and D are labeled with an appropriate letter to indicate the phase associated with the stator pole. The 8/6 SR motor also includes a rotor 110 having six rotor poles. The phases are energized in the order A, B, C and D for clockwise rotation and A, D, C, and B for counter-clockwise rotation. The commutation sequence is executed a total of 6 times for each complete revolution of the 8/6 SR motor. Therefore, twenty-four commutations are executed per revolution in the 8/6 SR motor.

Figure 14:
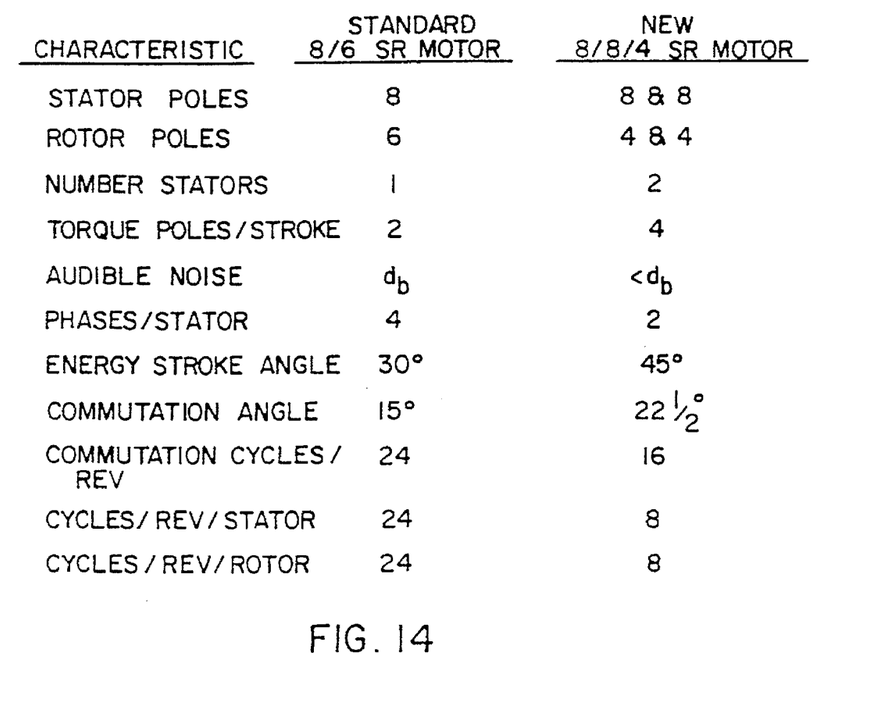
FIG. 14 is a chart contrasting the characteristics of the Standard 8/6 SR motor and the 8/8/4 SR motor in accordance with the present invention.

FIG. 14 presents a comparison chart summarizing the structural and operational characteristics for the 8/6 SR motor and the SR motor illustrated in FIG. 1A (referred to as an 8/8/4 SR motor). While the number of rotors and stators is doubled for the 8/8/4 SR motor, advantages provided by the SR motor of the present invention effectively overcome this apparent shortcoming.

Both the 8/6 SR motor and the 8/8/4 SR motor contain eight stator poles per stator. The 8/6 SR motor includes a rotor having six rotor poles while each of the two rotors in the 8/8/4 SR motor includes four rotor poles. As previously noted, the 8/6 SR motor has only one stator, while the 8/8/4 SR motor has two stators.

Even though the rotor 110 of the 8/6 SR motor contains six rotor poles, only two of the rotor poles are acted upon by two energized stator poles during a given stroke. The attractive forces tending to draw the two rotor poles to the energized stator poles tend to ovalize the stator yoke in the 8/6 SR motor since the two attracted stator poles are positioned at opposing locations of the stator 108.

On the other hand, all four rotor poles of one of the two rotors 6, 14 of the 8/8/4 SR motor are acted upon by four (4) stator poles associated with an energized phase winding. As a result, the attractive forces tending to draw the rotor poles to the energized stator poles tend to square the stator yoke having the energized stator phase windings in the 8/8/4 SR motor. Furthermore, since twice as many rotor poles in the 8/8/4 SR motor are acted upon in any stroke, only one-half the torque need be applied to each rotor pole in order to achieve the same torque applied to the rotor poles of the 8/6 SR motor. Therefore, the length of each stator and rotor (in the axial direction) may be reduced to a length one-half the length of a rotor and stator in an 8/6 SR motor having comparable operating characteristics but attracts only two (2) rotor poles during any given stroke.

In general, the ovalizing forces exerted upon the stator yoke in the 8/6 SR motor have been shown to deform the stator yoke to a greater degree than the squaring forces exerted upon the stator yoke in the 8/8/4 SR motor by an energized stator phase winding. It has been determined through experimentation that audible noise arising from the operation of an SR motor is caused in substantial part by the deformation of the stator yoke during the operation of an SR motor. It naturally follows that reducing deformation of the stator yokes in the 8/8/4 SR motor results in reduced audible noise during high speed operation of the motor.

In carefully controlled tests, the audible noise emanating from an 8/8/4 SR motor having two 2 inch stacks operating at 3000 rpm has been compared to an 8/6 SR motor having a four inch stack operating at 3000 rpm. The audible noise (under rated load) from the standard 8/6 SR motor was 72 decibels while the audible noise (under a same load) from the new 8/8/4 SR motor was only 68 decibels. It is believed that this reduction in noise is a direct consequence of the reduced deformation of the stator yokes in the 8/8/4 SR motor. The differences in audible noise will vary according to the operating conditions as well as the structure and materials used to construct the motors. However, theoretical hypothesis as well as actual testing indicate that the more evenly distributed attractive forces between the rotors and stators in the 8/8/4 SR motor results in a substantial decrease in audible noise in comparison to the 8/6 SR motor.

While both the 8/6 SR motor and the 8/8/4 SR motor both have four phases, the 8/8/4 SR motor splits the phases in an alternating manner between the two stators. As a result, each of the two stators in the 8/8/4 SR motor is only active for half of the phase cycles. As a result, the stators in the 8/8/4 are less susceptible to overheating during high speed operation and are less likely to require auxiliary cooling mechanisms.

As is well known in the art, the energy stroke angle (ESA) specifies the maximum angle of rotation in which an energized phase may exert a positive torque upon the rotor poles. The ESA is calculated for SR motors by the following relationship:

$$ESA = 360° / (2 * n_{rotor\ poles})$$

where ESA is in degrees and where $n_{rotor}$ poles equals the number of poles on each rotor. The stroke angle for the 8/6 SR motor is 30° while the stroke angle for the 8/8/4 SR motor is 45°.

The commutation angle is the number of degrees of rotation of the rotor wherein a selected set of rotor poles are acted upon by an energized stator phase winding when the duty cycles of adjacent phases are not overlapped. The commutation angle for the 8/6 SR motor is 15°, while the commutation angle for the 8/8/4 SR motor is 22.5°.

It is known that the switching losses in an SR motor increase as the number of commutations per revolution increase. It is therefore desirable to minimize the number of commutations per revolution. As noted in FIG. 14 in the row identified as Commutation Cycles/Rev, the number of commutations per revolution in the 8/6 SR motor is 24. On the other hand, the number of commutations per revolution for the 8/8/4 SR motor is only 16. It is further noted that in the 8/8/4 SR motor these commutations are evenly divided between each of the two stators. Therefore, while the stator and rotor of the 8/6 SR motor experience all 24 commutations per revolution, each stator and rotor in the 8/8/4 SR motor experience only 8 commutations per revolution.

Furthermore, the switching losses are generally proportional to the mass of the material experiencing the switching. Therefore, not only are losses reduced in the 8/8/4 SR motor as a result of the reduced number of total commutations per revolution, switching losses are further reduced since the loss per commutation in the 8/8/4 SR motor attributed to building and breaking down magnetic fields in the rotor and stator iron is roughly one half the loss per commutation in the 8/6 SR motor (assuming the total mass of each motor is approximately equal).

The above switching loss comparisons are rough approximations. However, they properly represent (albeit through approximation) the comparatively lower switching frequency as well as the substantially less mass of the rotor and stator iron subject to eddy current losses during the switching of the 8/8/4 SR motor.

An illustrative embodiment and a number of alternative embodiments of the present invention have been described. Based upon the illustrative embodiments, other variations of the disclosed invention will be apparent to those skilled in the art of SR motors. For example, inside-out versions of the present invention are contemplated wherein the rotating member is disposed outside the fixed member. It is also contemplated to use the present invention in a linear motor configuration wherein the rotor and stator poles are displaced along a line rather than the circumference of a circle wherein, in addition, a four-phase, 16/16/8 split phase SR motor is envisioned having two stators and two rotors, and wherein each rotor includes eight evenly spaced salient poles and each stator includes sixteen poles. Phases A and C are associated with the first stator and phases B and D are associated with the second stator.

In the 16/16/8 SR motor, the poles of a first stator are skewed 11.25 degrees (approximately the width of one pole) with respect to the poles of a second stator. The poles of the first rotor are aligned with the poles of the second rotor as in the illustrated embodiment of FIG. 1A. Alternatively, the stators may be aligned and the rotors skewed as in the alternative embodiment in FIGS. 9A and 9B. Of course, even larger four-phase, split phase SR motors (having even more stator poles and rotor poles) would be known in view of the disclosed embodiments.

Yet another alternative embodiment of a split-phase four phase SR motor is a 4/4/2 motor wherein each of the two rotors comprises two salient poles and each stator comprises four poles. The skew angle in the 4/4/2 split phase motor is 45 degrees.

Yet other embodiments of the present invention will be known in view of the disclosed illustrative embodiments.

The invention is intended to include the invention as well as equivalents thereof falling within the spirit of the invention as defined by the claims appended herein below.

What is claimed is:

1. A switched reluctance (SR) motor driven by phase drivers providing four phases for energizing a set of stator pole phase windings for attracting a set of rotor poles, the stator poles being separated by a radial gap from the rotor poles when oriented with the rotor poles for maximum inductance, and the four phases being commutated in accordance with rotational orientation feedback signals in a sequential order of first, second, third, and then fourth phase, said SR motor comprising:

a stator assembly including:

a first stator including an even number of poles, the even number of poles being associated with a first phase and a third phase of the four phases, the first phase and third phase being magnetically coupled to the first stator via phase windings associated with alternating ones of the even number of poles of the first stator; and a second stator, including an even number of poles, the even number of poles being associated with a second phase and a forth phase of the four phases, the second phase and forth phase being magnetically coupled to the second stator via phase windings associated with alternating ones of the even number of poles of the second stator; and a rotor assembly including:

a first rotor, coupled to a drive shaft, having an even number of poles, the even number of poles being no greater than one half the number of stator poles in the first stator assembly;

a second rotor, coupled to the drive shaft, having an even number of poles, the even number of poles being no greater than one half the number of stator poles in the second stator assembly, and wherein the first rotor and the second rotor are rotationally oriented such that when the rotor poles for the first rotor are radially aligned with stator poles associated with a phase of the first stator in a position forming maximum inductance paths, the rotor poles for the second rotor are radially disaligned with the stator poles associated with the second and fourth phases of the second stator.

2. The SR motor of claim 1 wherein the first rotor and second rotor each comprise exactly four poles extending radially from the axis of rotation the rotors.

3. The SR motor of claim 2 wherein the first stator and second stator each comprise exactly eight poles evenly spaced about the circumference of a first stator yoke and a second stator yoke.

4. The SR motor of claim 3 wherein the four poles for the second stator are disaligned with the stator poles associated with the second and fourth phases of the second stator by approximately one sixteenth of a full rotation when the four rotor poles for the first rotor ar radially aligned with stator poles associated with a phase of the first stator in a position forming maximum inductance paths.

5. The SR motor of claim 1 wherein the first rotor and second rotor each comprise exactly eight poles extending radially from the axis of rotation the rotors.

6. The SR motor of claim 5 wherein the first stator and second stator each comprise exactly sixteen poles evenly spaced about the circumference of a first stator yoke and a second stator yoke.

7. The SR motor of claim 1 further comprising a four phase drive circuit including four commutating transisters and two upper transistors, each of the two upper transistors being coupled to two phase windings.

8. The SR motor of claim 7 wherein the two phase windings are wound upon different sets of stator poles on a same stator.

9. The SR motor of claim 8 further comprising six diodes, the six diodes being coupled to the terminals of the phase windings to provide a current from ground to $V_s$ when a commutating transister is switched off.

10. The SR motor of claim 1 wherein each one the four phases is associated with a set of two phase windings, each set of two phase windings being magnetically coupled to a same set of four stator poles.

11. The SR motor of claim 10 wherein each phase winding is coupled to a separate commutating transister.

12. The SR motor of claim 10 further comprising a four phase drive circuit including eight commutating transistors and four upper transistors, each of the four upper transistors being coupled to two phase windings.

13. The SR motor of claim 12 wherein the two phase windings are wound upon different sets of stator poles on a same stator.

14. The SR motor of claim 13 further comprising twelve diodes, the twelve diodes being coupled to the terminals of the phase windings to provide a current from ground to $V_s$ when a commutating transister is switched off.

15. The SR motor of claim 1 wherein the phase windings are magnetically coupled to the stator poles in order to induce opposite polarities on nearest stator poles on a stator associated with a same one of the four phases.

16. The SR motor of claim 1 wherein the first rotor and second rotor have a have a same axis of rotation.

17. The SR motor of claim 16 wherein the poles of the first rotor are substantially rotationally aligned with the poles of the second rotor.

18. The SR motor of claim 16 wherein the stator poles of the first stator are rotationally skewed with respect to the stator poles of the second stator.

19. The SR motor of claim 1 wherein the width of each rotor pole at the end of the rotor pole proximate the stator poles is approximately equal to the width of each stator pole at the end of the stator pole proximate the rotor poles.

20. The SR motor of claim 19 wherein the width of each stator pole at an end proximate the rotor poles is approximately equal to the distance between adjacent stator poles at the end proximate the rotor poles.

21. A switched reluctance motor having a rotor assembly and a stator assembly, the stator assembly including a first stator and a second stator axially aligned with the first stator, each stator having magnetically permeable poles circumferentially distributed about a stator yoke, the rotor assembly including a first rotor and a second rotor axially aligned with the first rotor, each rotor having magnetically permeable poles circumferentially distributed and separated from corresponding stator poles by a radial gap when oriented in a position of maximized inductance with the corresponding stator poles, the rotor poles providing low reluctance flux linkage paths joining energized stator poles, and a set of n phase windings associated with n sets of the stator poles, the poles of each stator being energized by one-half of the n phase windings, and wherein the value n is a multiple of four.

22. The switched reluctance motor as set forth in claim 21 wherein the number of phases n equals 4.

23. The switched reluctance motor of claim 21 wherein the poles of the first and second rotors are rotationally aligned, and the poles of a first stator are rotationally skewed with respect to the poles of a second stator.

24. The switched reluctance motor of claim 23 wherein the skew angle is approximately equal to one-sixteenth of a full rotation.

25. The switched reluctance motor of claim 21 wherein the poles of the first and second stators are rotationally aligned and the poles of the first rotor are rotationally skewed with respect to the poles of the second rotor.

26. The switched reluctance motor of claim 21 wherein each rotor comprises exactly four rotor poles and each stator comprises exactly eight stator poles.

27. A switched reluctance (SR) motor driven by phase drivers providing four phases for energizing a set of stator pole phase windings for attracting a set of rotor poles, the stator poles being separated by a linear gap from the rotor poles when oriented with the rotor poles for maximum inductance, and the four phases being commutated in accordance with orientation feedback signals in a sequential order of first, second, third, and then fourth phase, said SR motor comprising:

a stator assembly including:
a first stator including an even number of poles, the even number of poles being associated with a first phase and a third phase of the four phases, the first phase and third phase being magnetically coupled to the first stator via phase windings associated with alternating ones of the even number of poles of the first stator; and
a second stator, including an even number of poles, the even number of poles being associated with a second phase and a forth phase of the four phases, the second phase and forth phase being magnetically coupled to the second stator via phase windings associated with alternating ones of the even number of poles of the second stator; and a rotor assembly including:
a first rotor having an even number of poles, the even number of poles being no greater than one half the number of stator poles in the first stator assembly;
a second rotor having an even number of poles, the even number of poles being no greater than one half the number of stator poles in the second stator assembly, and
wherein the first rotor and the second rotor are linearly spaced such that when the rotor poles for the first rotor are aligned with stator poles associated with a phase of the first stator in a position forming maximum inductance paths, the rotor poles for the second rotor are disaligned with with stator poles associated with the second and fourth phases of the second stator.

* * * * *